(12) United States Patent
Singh et al.

(10) Patent No.: US 11,930,038 B2
(45) Date of Patent: Mar. 12, 2024

(54) PROCESSING REFRESH TOKEN REQUEST AT APPLICATION PROGRAMMING INTERFACE (API) GATEWAY

(71) Applicant: HEWLETT PACKARD ENTERPRISE DEVELOPMENT LP, Houston, TX (US)

(72) Inventors: Satyendra Singh, Bangalore (IN); Ganesh Valluru Ramakrishnappa, Bangalore (IN); Tathagata Roy, Bangalore (IN); Ravinder Reddy Bommineni, Bangalore (IN); Sharan Chaitanya Potturu, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 433 days.

(21) Appl. No.: 17/376,386

(22) Filed: Jul. 15, 2021

(65) Prior Publication Data
US 2023/0018767 A1    Jan. 19, 2023

(51) Int. Cl.
*H04L 9/40* (2022.01)
(52) U.S. Cl.
CPC .... *H04L 63/1458* (2013.01); *H04L 2463/142* (2013.01)
(58) Field of Classification Search
CPC ................. H04L 63/1458; H04L 2463/142
See application file for complete search history.

(56) References Cited

U.S. PATENT DOCUMENTS

| 10,972,453 | B1* | 4/2021 | Natarajan | ............ H04L 63/0807 |
| 2016/0259936 | A1* | 9/2016 | Mukherjee | ............ H04L 63/061 |
| 2017/0026488 | A1 | 1/2017 | Hao et al. | |
| 2020/0067341 | A1 | 2/2020 | Glover et al. | |
| 2020/0177576 | A1* | 6/2020 | Vudathu | ............. H04L 63/0815 |
| 2020/0349569 | A1* | 11/2020 | Murao | .................... G06Q 20/20 |
| 2020/0396299 | A1* | 12/2020 | Mitsov | .................. G06F 9/4843 |

(Continued)

FOREIGN PATENT DOCUMENTS

| CN | 109660546 A | 4/2019 |
| CN | 111147525 A | 5/2020 |

OTHER PUBLICATIONS

Amazon Web Services, Inc., "Security Overview of Amazon API Gateway," AWS Whitepaper, Nov. 2020, https://d1.awsstatic.com/whitepapers/api-gateway-security.pdf?svrd_sip6.

(Continued)

*Primary Examiner* — Stephen T Gundry
(74) *Attorney, Agent, or Firm* — Remfry & Sagar

(57) ABSTRACT

Example implementations relate to the processing of refresh token requests at an API gateway. The API gateway determines a first time associated with receipt of the refresh token request and a second time associated with the generation of a current access token. The current access token and a refresh token in the refresh token request are provided by the API gateway to the client device for accessing a backend service. The API gateway determines whether a difference between the first time and the second time is within a pre-defined threshold duration. When the difference between the first time and the second time is within the pre-defined threshold, the API gateway denies the refresh token request for generating the new access token and transmits the current access token back to the client device.

20 Claims, 5 Drawing Sheets

(56) References Cited

U.S. PATENT DOCUMENTS

2021/0126789 A1\* 4/2021 Chang .................. H04L 67/306
2021/0336966 A1\* 10/2021 Gujarathi .............. H04L 9/3247
2021/0377248 A1\* 12/2021 Brainer ................ H04L 63/083

OTHER PUBLICATIONS

Marin, D., "Validating Okta Access Tokens in PHP Using AWS API Gateway and Lambda Authorizers," Oct. 5, 2020, https://developer.okta.com/blog/2020/10/05/validating-okta-access-tokens-php-aws-api-gateway-lambda.

\* cited by examiner

PROCESSING REFRESH TOKEN REQUEST AT APPLICATION PROGRAMMING INTERFACE (API) GATEWAY

BACKGROUND

An application programming interface (API) gateway is an API management tool that provides an interface between client applications and a collection of backend services. The API gateway receives a request from a client application to access a backend service. The API gateway authenticates the client application to access the backend service by providing an access token to the client application. The client application may transmit a request embedded with the access token for accessing the backend service. The API gateway authorizes the client application to access the backend service based on the access token. On successful authorization, the API gateway routes the client application to the backend service.

BRIEF DESCRIPTION OF THE DRAWINGS

Various examples will be described below with reference to the following figures.

Figure 1:
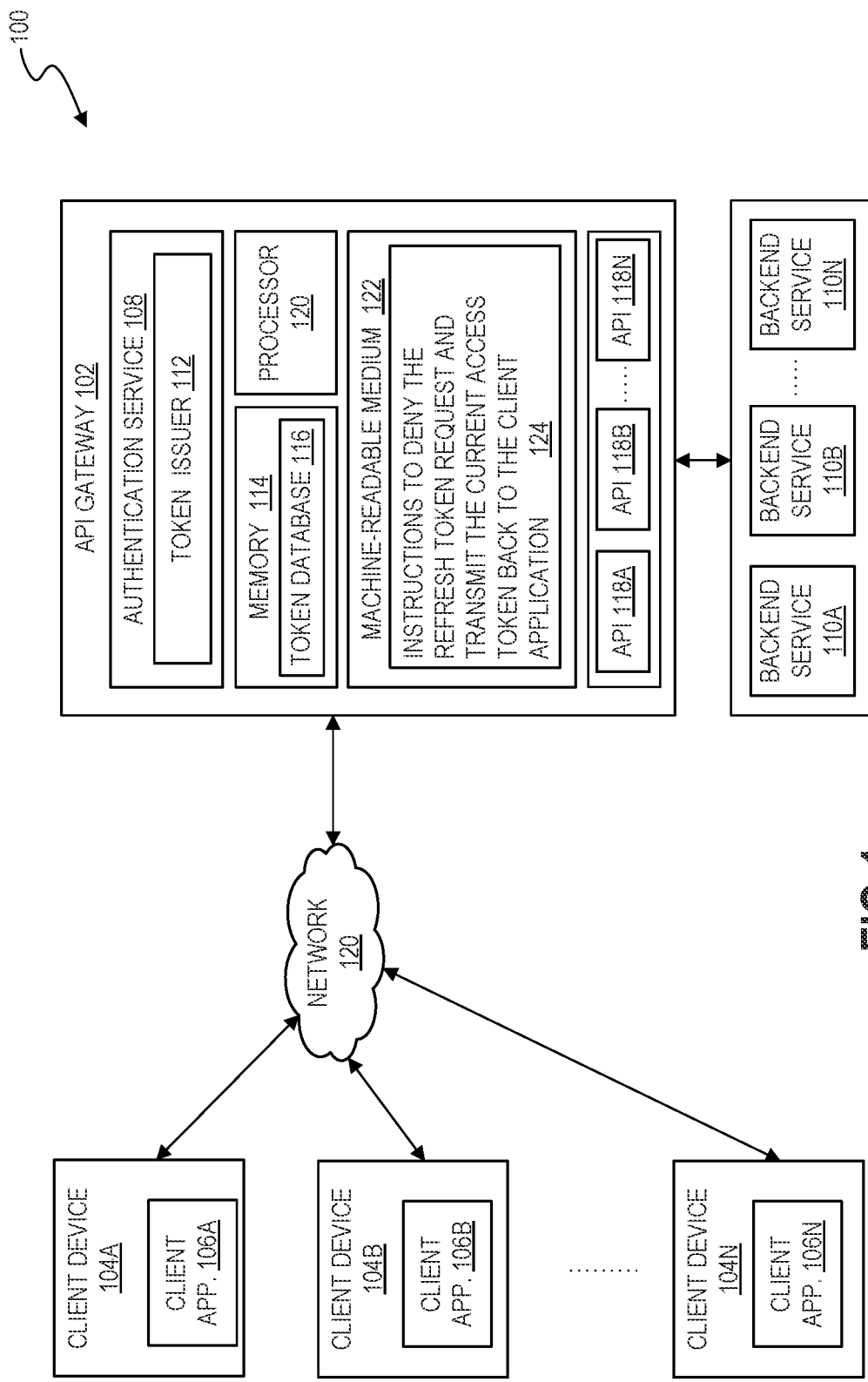
FIG. 1 is a system for processing requests at an application programming interface (API) gateway, in accordance with an example.

Throughout the drawings, identical reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing examples only and is not intended to be limiting. As used herein, the singular forms "a," "an," and "the" are intended to include the plural forms as well, unless the context clearly indicates otherwise. The term "another," as used herein, is defined as at least a second or more. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 3:
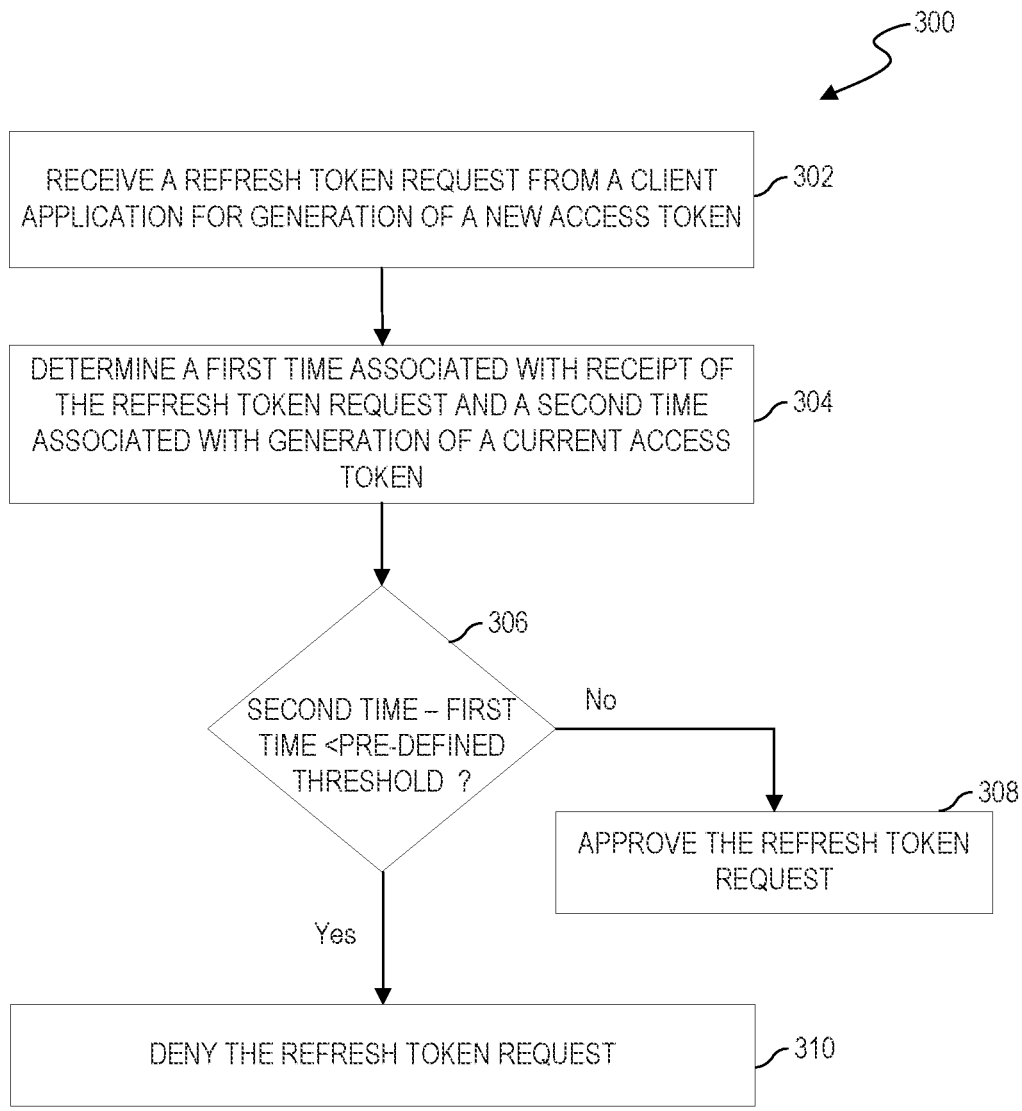
FIG. 3 is a flow diagram of a method for processing refresh token request by an API gateway, in accordance with an example.
Figure 4:
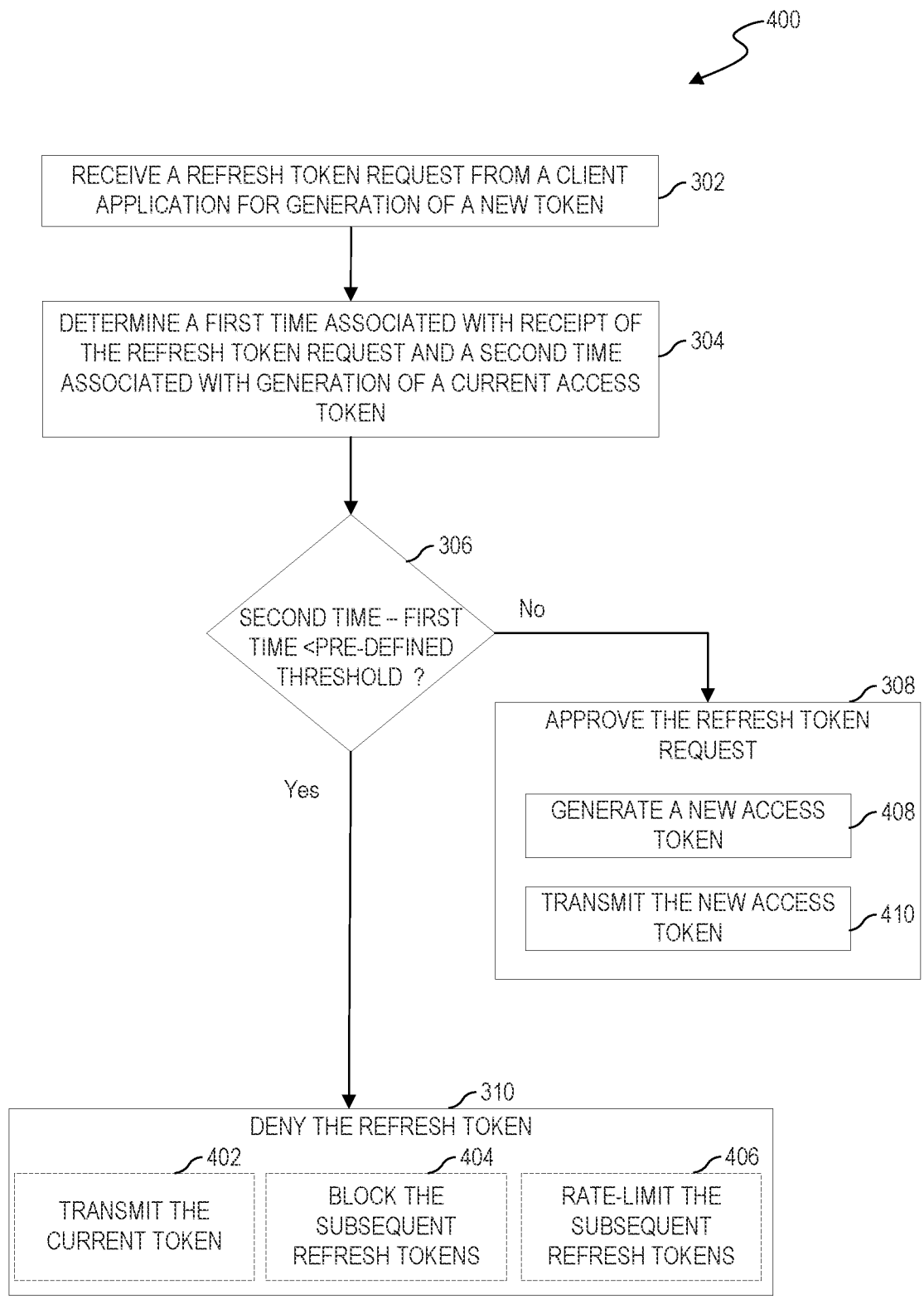
FIG. 4 is an alternate flow diagram of a method for processing refresh token request by an API gateway, in accordance with an example.
Figure 5:
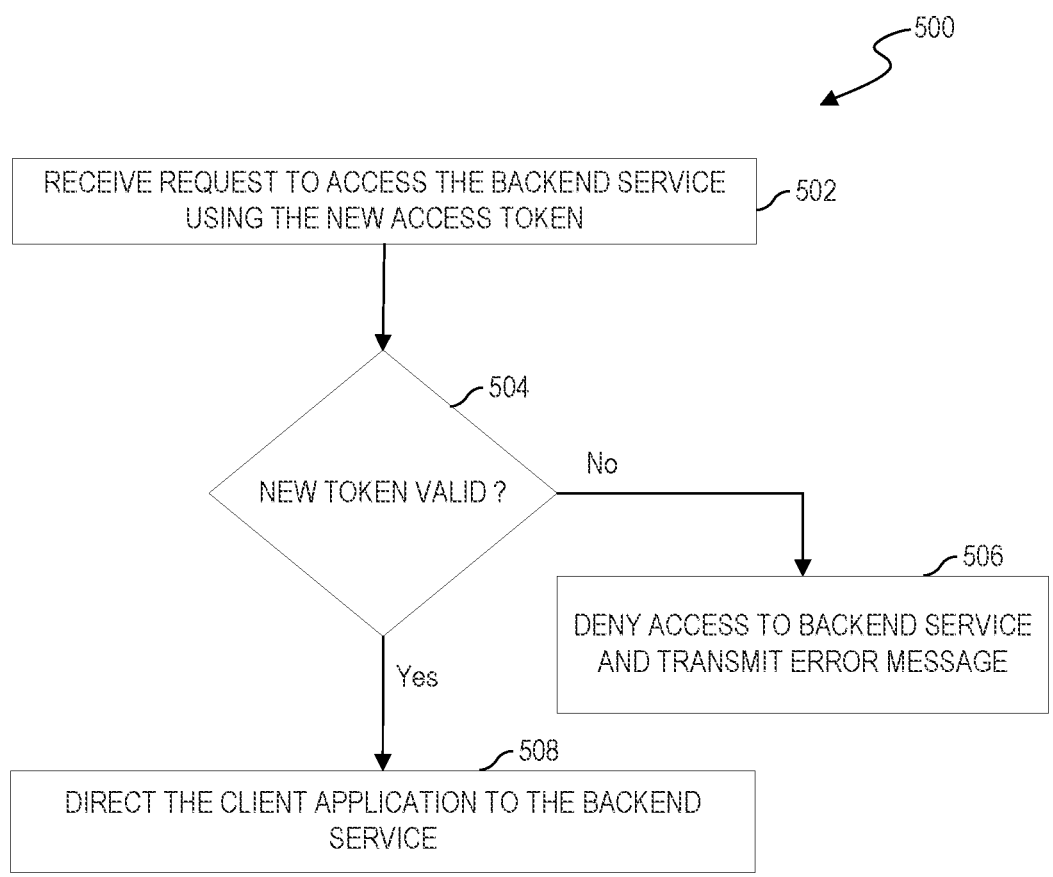
FIG. 5 is a flow diagram of a method of processing a request with a new access token to access a backend service, in accordance with an example.

For purposes of explanation of the present disclosure, certain examples are described with reference to the components illustrated in FIGS. 1-5. The functionality of the illustrated components may overlap, however, and may be present in a fewer or greater number of elements and components. Moreover, the disclosed examples may be implemented in various environments and are not limited to the illustrated examples. Further, the sequence of operations described in connection with FIGS. 3, 4, and 5 are examples and are not intended to be limiting. Additional or fewer operations or combinations of operations may be used or may vary without departing from the scope of the disclosed examples. Thus, the present disclosure merely sets forth examples of implementations, and many variations and modifications may be made to the described examples. Such modifications and variations are intended to be included within the scope of this disclosure and protected by the following claims.

An application processing interface (API) gateway is used for supporting multiple backend services and processing requests from multiple client applications. The client applications may be end-customer applications that require authentication before accessing the backend services. The client applications may include a mobile application or a web application. The backend services may include, but are not limited to, a data service, a web service, a java service, or a security service. The client applications are routed to the backend services by the API gateway using APIs associated with the client applications. When the API gateway receives a request from a client application for accessing a backend service, the API gateway may authenticate the client associated with the client application and generate an access token for accessing the backend service. The access token is a token that allows the client application to access the backend service for a defined duration. Further, the access token may be provided by the API gateway on behalf of the backend service. Furthermore, the access token may include information associated with the client device, and the scope of access to the client application. The access token is transmitted by the API gateway to the client application. The client application may use the access token to request access to the backend service via an API call to the API gateway.

On receiving the API call from the client application with the access token, the API gateway validates the access token and authorizes the client application to access the backend service via the API customized for the client application. The access token generated by the API gateway for processing the API call may be short-lived and may have a limited validity period. In an example, the validity period of the access token may be decided based on the security requirement of the backend service. As the access token is short-lived, the client application may need to get a new access token by re-entering their access credentials once the access token expires. This process may be time-consuming and may hamper user experience while accessing the backend service.

To avoid this re-authentication, the API gateway may use a refresh token. A refresh token is an additional token issued along with the access token by the API gateway for accessing the backend service. The refresh token may be used by the client for obtaining additional access tokens. The validity of the refresh token is longer than that of the access token. The client application may request the new access token by transmitting the refresh token in a request to the API gateway without requiring re-authentication. The access token and the related refresh token may be stored at a client device running the client application. Once the refresh token expires, the client may need to be re-authenticated. When the client application receives a rejection or error message indicating that the access token has expired while trying to access a backend service, the client application may request a new access token.

The API gateway on receiving the refresh token request may generate the new access token for the client application to access the backend service. In some cases, the client application may send multiple refresh token requests for receiving new access tokens to the API gateway. For example, an attacker may keep on transmitting refresh token requests for the generation of multiple new access tokens. The API gateway processing these refresh token requests may get overloaded and turn unresponsive. In another example, the client may generate multiple refresh token requests inadvertently. The processing of all the refresh token requests for a specific backend service may lead to the backend service becoming unavailable for the others client devices requesting access to the backend service.

Examples disclosed herein address the problems mentioned above by providing a method and system for processing refresh token requests at an API gateway. The API gateway may perform authentication and authorization of client devices requesting access to backend services. In some examples, the API gateway may receive a refresh token request for generating a new access token from the client application. The refresh token request may be generated by the client application for receiving a new access token. In some examples, the API gateway may determine a first time associated with a receipt of the refresh token request and a second time associated with the generation of a current access token. Further, the API gateway may determine whether a difference between the first time and the second time is within a pre-defined threshold duration. The pre-defined threshold duration may be defined based on the backend service associated with the current access token, or the validity of the current access token. When the difference between the first time and the second time is within the pre-defined threshold duration, the API gateway may deny the refresh token request for generating the new access token. The API gateway may transmit the current access token back to the client application.

The denying of the refresh token requests and transmission of the current access token may reduce the processing of unnecessary refresh token requests at the API gateway. As the API gateway denies the unnecessary refresh token requests, refresh token requests from client applications genuinely requesting new access tokens may be processed in minimal time. Additionally, this type of refresh token processing may avoid any outages at the API gateway. Further, the processing of the refresh token request based on pre-defined threshold duration may prevent a denial of service (DOS) situation at the API gateway due to flooding of unnecessary refresh token requests. Further, as the API gateway may maintain information of the access tokens generated, resource consumption to process the refresh token requests may be minimal.

Referring now to FIG. 1, a system 100 for processing requests from client devices by an API gateway 102 is presented, in accordance with an example. The system 100 may include an API gateway 102 and client devices 104A, 104B . . . 104N (hereinafter referred to as 104A-104N) hosting client applications 106A, 106B . . . 106N, respectively. The client devices 104A-104N may be electronic devices on which the client applications 106A-106N are running. Examples of the client devices 104A-104N may include, but are not limited to, smartphone, tablet computer, smartwatch, notebook computer, desktop computer, workstation, or Internet of Things (IoT) appliance. Users of the client devices 104A-104N may request access to resources provided by the backend services 110A-110N or an external cloud platform using the client applications 106A-106N.

Examples of the client applications 106A, 106B . . . 106N (hereinafter referred to as 106A-106N) may include, but are not limited to, mobile applications, web applications, fat client applications, thin client applications, desktop applications, native applications, and Internet of Things (IoT) applications. Although FIG. 1 illustrates a single application at each of the client devices 104A-104N, each client device may run multiple client applications.

The client devices 104A-106N may be authenticated and authorized by the API gateway 102 before processing requests from the client applications 106A-106N. The client applications 106A-106N may send requests to the API gateway 102 for accessing backend services (described later) supported by the API gateway 102 over a network 120. The client applications 106A-106N may communicate with the API gateway 102 over a network 120 between the client devices 104A-104N and the API gateway. Examples of the network 120 may include, but are not limited to, an Internet Protocol (IP) or non-IP-based, wireless LAN (WLAN), metropolitan area network (MAN), wide area network (WAN), a storage area network (SAN), a personal area network (PAN), a cellular communication network, and the Internet. Communication over the network 120 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 120 may be enabled via wireless (e.g., Wi-Fi®, cellular communication, satellite communication, Bluetooth, etc.) communication technologies.

The API gateway 102 may be a single point entry for the client applications 106A-106N for accessing backend services 110A-110N. In some examples, the API gateway 102 may be a centralized server in an enterprise network. In some examples, the API gateway 102 may be managed by a service provider that provides secure access to the backend services 110A-110N. The API gateway 102 may include a first network interface (not shown) to receive requests from the client applications 106A-106N and a second network interface (not shown) to communicate with the backend services 110A-110N. The API gateway 102 may manage the first network interface and the second network interface to control access to the backend services 110A-110N by the client applications 106A-106N. The backend services 110A-110N may include, but are not limited to, micro-service, Service-oriented architecture (SOA) service, Restful Web Services (REST) service, Simple Object Access Protocol (SOAP) service for accessing web services, monolith service, a standard routine, a standard function, a lambda function, and a procedure. In some examples, data and/or applications, deployed external to the API gateway, may also be considered as a backend service.

The API gateway 102 may provide APIs 118A, 118B . . . 118N (hereinafter referred to as 118A-118N) using which the client devices 104A-104N access the respective backend services 110A-110N after authorization. The API gateway 102 may receive requests from client applications 106A-106N to access one or more APIs 118A-118N providing access to respective backend services 110A-110N. Before providing access to a requested backend service, the API gateway 102 may authenticate and authorize the client devices 104A-104N before providing the client applications 106A-106N access to the backend services 110A-110N.

To manage the authentication and authorization, the API gateway 102 may include an authentication service 108 and a memory 114 with a token database 116. The API gateway 102 may authenticate the client devices 104A-104N using the authentication service 108. In an example, when the client application 106A requests access to a backend service 110A, the API gateway 102 may authenticate the client device 104A and provide the client device 104A with an access token.

The authentication service 108 is responsible for authenticating and authorizing client devices 104A-104N requesting access to the backend services 110A-110N. The authentication service 108 may authenticate the client devices 104A-104N transmitting requests via the respective client applications 106A-106N. In an example, the authentication service 108 may be implemented using existing authorization protocols that allow the client applications 106A-106N to access the backend services 110A-110N securely. The authorization protocol or framework provides client applications access tokens that may be used for authorizing the client device. In some examples, the authentication service 108 may be implemented as an access token service. The authentication service 108 may employ an agent or an authentication plugin to intercept the requests coming to the API gateway 102 and determine whether the request includes an access token. When the request does not include the access token, the authentication service 108 may request a token issuer 112 to generate an access token.

In some examples, the authentication service 108 may include the token issuer 112 for issuing the access token. The token issuer 112 may generate an access token, encrypt sensitive data within the access token body, and sign the access token using a signature (e.g., a private key of the token issuer 112). In some examples, the access token may be a JSON web token (JWT) or an OAuth token. In an example, the access token issued may be associated with an API that routes a client application to the respective backend service. For example, the client application 106B may be issued the access token to access a backend service 110B using an API 118B. The token issuer 112 may transmit a signed encrypted access token to a client application (e.g., the client application 106A) requesting access to a backend service (e.g., the backend service 110A). The access token may include a validity timestamp. In some examples, the token issuer 112 may issue a refresh token along with the access token. The refresh token may be used by the client device to generate additional access tokens when the validity of the current access token expires.

In some examples, the API gateway 102 may include a processor 120 and that executes instructions stored in a machine-readable medium 122. The processor 120 may be implemented as one or more microprocessors, microcomputers, microcontrollers, digital signal processors, central processing units, state machines, logic circuitries, and/or any devices that manipulate signals based on operational instructions. The functions of the processor 120 may be provided through the use of dedicated hardware as well as hardware capable of executing machine-readable instructions. The processor 120 may be configured to execute instructions (i.e. programming or software code) stored in the machine-readable medium 122 to perform the functions of the API gateway 102 as described herein. For example, the machine-readable medium 122 may include instructions 124. The instructions 124 when executed causes the processor 120 to deny a refresh token request received at the API gateway 102 and transmit the current access token back to the client application. When the API gateway 102 determines that the current access token is valid, the request for generation of a new access token using the refresh token is denied. Although the FIG. 1 shows only one instruction, it should be understood that several instructions may be stored in the machine-readable medium 122. Other instructions and details regarding the processing of the refresh token request and denying of the refresh token request is explained in FIGS. 2, 3 and 4.

Data associated with the access token and refresh token may be stored in the token database 116 in the memory 114 of the API gateway 102. The memory 114 may include any non-transitory computer-readable medium including, for example, volatile memory (e.g., RAM), and/or non-volatile memory (e.g., EPROM, flash memory, a hard disk drive, etc.). In an implementation, the token database 116, may be a cache memory in which data related to the tokens (i.e., the access tokens and refresh tokens) may be stored. In some examples, the information associated with each access token may include an identifier, a timestamp associated with a time of generation of the access token, a signature of the token issuer 112, and a server ID. The identifier may be the hash of the access token. The server ID may indicate the Internet protocol (IP) address of a server providing the backend service. The API gateway 102 may transmit the access token and the refresh token to the client device requesting access to a backend service. In some examples, the transmitted access token may have a validity timestamp associated with the validity of the access token. The information present in the access token transmitted to the client device may include an identifier, a signature, a server ID, and the validity timestamp.

In some examples, the API gateway 102 may also perform an authorization of a request for accessing a backend service received with the access token using the authentication service 108. The authentication service 108 may validate the access token present in the request received from the client applications 106A-106N. The authentication service 108 may verify information related to the access token including, but not limited to, the identifier, the signature, the server ID, the validity timestamp, and the authorization scope. In an example, the authentication service 108 may authorize an access token based on the validity of the access token. On successful authorization using the access token, the API gateway 102 may route the client application 106A to the requested backend service 110A via the respective API 118A.

In particular, the APIs 118A-118N may be invoked after authorization of a request by the API gateway 102 to route the client applications 106A-106N to the backend services 110A-110N. In some examples, the APIs 118A-118N may be customized APIs for client devices 104A-104N for routing the respective client applications 106A-106N to the plurality of the backend services 110A-110N, a plurality of other applications, or computing platforms.

Figure 2:
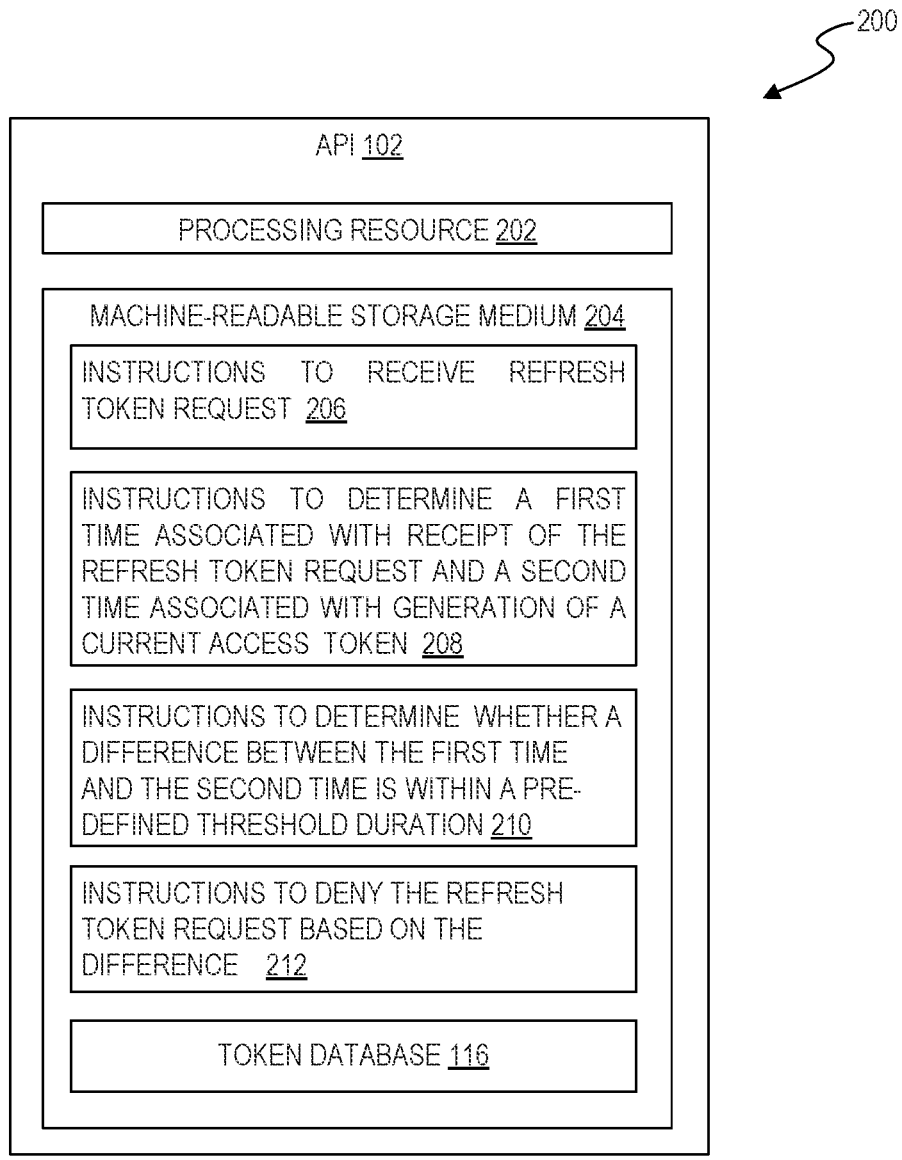
FIG. 2 illustrates a block diagram of an API gateway, in accordance with an example.

Turning now to FIG. 2, a block diagram 200 of the API gateway 102 is presented, in accordance with an example. For illustration purposes, FIG. 2 is described in conjunction with FIG. 1. The API gateway 102 may include a processing resource 202 operably coupled to a machine-readable storage medium 204 storing executable program instructions 206, 208, 210 and 212 that are executed for processing requests received from client applications. The processing resource 202 and the machine readable medium are similar to the processor 120 and the machine readable medium 122 respectively, as described in FIG. 1. In some examples, the API gateway 102 may be the server handling requests from the client applications 106A-106N. The server may be part of a distributed network environment of an enterprise or a service provider.

In some examples, the machine-readable storage medium 204 may be any electronic, magnetic, optical, or any other physical storage device that may store data and/or executable instructions. For example, the machine-readable storage medium 204 may include one or more of a Random Access Memory (RAM), an Electrically Erasable Programmable Read-Only Memory (EEPROM), a storage drive, a flash memory, a Compact Disc Read-Only Memory (CD-ROM), and the like. The machine-readable storage medium 204 may be non-transitory storage. Further, the processing resource 202 may be a physical device, for example, one or more Central Processing Unit (CPU), one or more semiconductor-based microprocessors, one or more graphics processing unit (GPU), application-specific integrated circuit (ASIC), a field-programmable gate array (FPGA), other hardware devices capable of retrieving and executing instructions stored in the machine-readable storage medium 204, or combinations thereof.

The machine-readable storage medium 204 may be encoded with the executable instructions 206, 208, 210, 212 (hereinafter collectively referred to as instructions 206-212) to perform operations at one or more blocks of a method described in FIGS. 3 and 4 (described later). The processing resource 202 may fetch, decode, and execute the instructions 206-212 stored in the machine-readable storage medium 204 to process requests received from the client applications 106A-106N at the API gateway 102. For example, the instructions 206 when executed by the processing resource 202 may cause the API gateway 102 to receive a refresh token request from a client application. The refresh token request is transmitted to generate a new access token for the client application to access a backend service. The refresh token request includes the refresh token issued by the API gateway 102. The refresh token and the access token are provided by authentication service 108 using the token issuer 112 at the API gateway 102. The API gateway 102 transmits the refresh token along with the current access token to the client device after authenticating the client device requesting access to backend service. The client device may maintain the refresh token in its memory. The client device may use the refresh token to obtain addition access token (i.e., new access tokens). Further, the instructions 208, when executed by the API gateway 102 may cause the processing resource 202 to determine a first time associated with the receipt of the refresh token request and a second time associated with the generation of the current access token. The current access token and the refresh token are associated with the backend service requested by the client application. The current access token and the refresh token are issued by the API gateway 102 after authenticating the client device. In an example, the access token and the refresh token may be issued by the API gateway 102 to client device 104A running the client application 106A that is requesting access to the backend service 110A.

Furthermore, the instructions 210, when executed by the API gateway 102 may cause the processing resource 202 to determine whether a difference between the first time and the second time is within a pre-defined threshold duration. Furthermore, in some examples, the instructions 212, when executed by the processing resource 202 may cause the API gateway 102 to deny the refresh token request when the difference between the first time and second time is within a pre-defined threshold duration. The pre-defined threshold duration may be set based on a backend service associated with the current access token or the validity of the current access token. In some examples, the pre-defined threshold duration may be set by an administrator of the API gateway 102. In other examples, the pre-defined threshold duration may be set automatically by the API gateway 102 based on the monitoring of requests received for a backend service.

In some examples, the machine-readable storage medium 204 may also store the token database 116. In an example, the token database 116 may include information related to the current access token. The information may include an identifier, a signature of the token issuer 112, a timestamp of when the current access token was generated, and the server ID associated with the backend service for which the access token is generated. Additionally, the token database 116 may maintain information about the refresh token associated with the current access token.

Moving now to FIGS. 3 and 4, the flow diagram of methods 300 and 400 for processing refresh token requests by the API gateway is presented. In some implementations, methods 300 and 400 may include more or fewer blocks than are shown. In some implementations, one or more of the blocks of the methods 300 and 400 may, at certain times, be ongoing and/or may repeat. In some implementations, blocks of the methods 300 and 400 may be combined. The methods 300 and 400 may be implemented in the form of executable instructions stored on a machine-readable storage medium (e.g., the machine-readable storage medium 204) and executed by a processor (e.g., the processing resource 202) and/or in the form of electronic circuitry at the API gateway 102 of FIG. 1. For illustration purposes, the methods 300 and 400 are described in conjunction with FIG. 1.

At block 302, the API gateway 102 may receive a refresh token request from a client application for the generation of a new access token. The refresh token includes a refresh token associated with a backend service. The refresh token request may be transmitted by the client application when a current access token provided to the client device 104A for accessing the backend service 110A expires. The refresh token is generated along with the access token by the API gateway 102 for authorizing the client device 104A and allowing the client application 106A to access the requested backend service 110A. For example, a client application 106A receiving streaming data (e.g., video content) from a backend service may be provided with both a refresh token and an access token. When the access token expires the client application may transmit the refresh token in a refresh token request to the API gateway 102.

At block 304, the API gateway 102 may determine a first time associated with receipt of the refresh token request and a second time associated with the generation of the current access token. The API gateway 102 may determine the first time as the time when the refresh token request is received at the API gateway 102. The refresh token request includes the refresh token issued by the API gateway 102. The refresh token may include a string or a code indicative of authorization granted to the client device by the backend service. The first time may be associated with an internal time of a processor at the API gateway 102. In an example, the refresh token request is sent by the client application 106A when access to the backend service 110A is denied due to the expiry of the current access token. In some examples, to determine the second time, the API gateway 102 may retrieve data associated with the client device from the token database 116. The data may include access tokens and refresh tokens associated with client applications running on the client device. The API gateway 102 may store the access tokens and the refresh token issued in the token database 116 in key/value pairs. Tokens (i.e., both the access token and the refresh token) associated with each combination of the client device and the client application is stored separately. On receiving a request from the client application, the API gateway 102 may search for the tokens issued to the client device and the client application that is transmitting the refresh token request. The access token and refresh token issued by the API gateway 102 for the client application 106A at client device 104A may be retrieved using in-memory caching. In some examples, the information associated with the current access token can be used by the API gateway 102 to determine the second time. For example, from a timestamp associated with the generation of the current access token, the API gateway 102 can determine the second time.

At block 306, the API gateway 102 may determine whether a difference between the first time and the second time is within a pre-defined threshold duration. The pre-defined threshold duration is set based on the validity of the current access token, or a backend service associated with the current access token. The difference between the first time and the second time indicates whether the access token has been generated recently and is still active. When the difference between the first time and the second time is within the pre-defined threshold, the current access token is valid. The predefined threshold may be set based on the validity of the current access token.

In some cases, based on the backend service the pre-defined threshold duration may be set, as the client devices may not require a new access token frequently. In an enterprise scenario, the pre-defined threshold duration may be set to ensure that unnecessary refresh token requests do not create a denial of service at the API gateway 102. In some cases, the pre-defined threshold may be dynamically set based on analysis of the refresh token requests received at the API gateway 102 for the backend service.

At block 306, in situations where the API gateway 102 determines that the difference between the first time and the second time is within the pre-defined threshold duration, the refresh token request for generating the new access token is denied (at block 310) by the API gateway 102. When a request for the new access token is received from the client application before the expiry of the current access token, the API gateway 102 may consider it as an invalid request and transmit the current access token back to the client device. In some cases, when multiple refresh token requests are received from a client device within the pre-defined threshold, the API gateway 102 may consider the request as a malicious request.

At block 306, in situations where the API gateway 102 determines that the difference between the first time and the second time is greater than the pre-defined threshold duration the API gateway 102 may approve (at block 308) the refresh token request and generate the new access token for the client application. The refresh token request may be sent by the client application when the current access token has expired. In cases where the current access token has expired, the request for new access token is approved. The API gateway 102 may verify the validity of the refresh token before generating the new access token using the token issuer.

Moving now to FIG. 4, a flow diagram of a method 400 for processing refresh token requests by the API gateway is presented, in accordance with an example. The initial blocks of method 400 are the same as the blocks 302, 304, 306, 308, and 310 of FIG. 3. The blocks 402, 404, 406, 408, and 410, are additional actions that may be performed by the API gateway 102 and are described below.

In some examples, the API gateway 102 may perform different operations along with denying the refresh token request at block 308. In an example, at block 402, the API gateway 102 may deny the refresh token request and transmit back the current access token to the client device 104A. The API gateway 102 may search for access tokens and refresh tokens issued to the client device for the client application that is transmitting the refresh token request. From the retrieved results, the current access token is transmitted back to the client device. As the access tokens and refresh tokens are maintained at the API gateway 102 using the token database 116, the entire process of validating the refresh token requests is performed with minimal resource consumption.

In another example, at block 404, the API gateway 102 may block the processing of multiple refresh token requests. The API gateway 102 may determine that multiple refresh token requests are being received and block each of the subsequent refresh token requests to prevent a denial of service (DOS) attack on the API gateway 102. In cases when multiple refresh token requests are received from the client application at the API gateway 102, each of the subsequent refresh token requests received at the API gateway 102 may not be processed for a pre-defined period. In some examples, the receipt of multiple refresh token requests may indicate a possibility that the client device transmitting the multiple requests is malicious. In an example, to prevent the malicious client device from creating the DOS at the API gateway 102, the refresh token requests from the client device may not be processed by the API gateway 102.

In another example, at block 406, the API gateway 102 may rate-limit the processing of the subsequent refresh token requests from the client application. In some cases, multiple refresh tokens may be generated inadvertently at the client device. Instead of considering the multiple refresh tokens malicious, the API gateway 102 may process the subsequent refresh token requests in a rate-limited manner. In some cases, the API gateway 102 may perform a combination of blocks 402, 404, and 406. In some examples. The API gateway may transmit back the current access tokens for a certain period of time before blocking the refresh token request. In other examples, the API gateway 102 may rate-limit the processing of the refresh token requests. The method 400 may be performed by the API gateway 102 for processing the refresh token requests from the client application until the refresh token is valid.

At block 408, the API gateway 102 may generate the new access token for the client application based on the approval of the refresh token request. The new access token is generated by the token issuer 112. At block 410, the new access token may be transmitted to the client application 106A. The new access token may include an identifier, a signature of the token issuers, a validity timestamp, and a server ID of the backend service. Once the new access token is generated, it may be used by the client application to request access to the backend service, as discussed in FIG. 5.

In some examples, the new access token generated and transmitted to the client device at blocks 408 and 410 respectively may be used by the client application to request access to the backend service. FIG. 5 is a flow diagram of a method 500 for processing a request with the new access token by the API gateway 102, in accordance with an example. In some implementations, the method 500 may include more or fewer blocks than the ones shown in FIG. 5. In some implementations, one or more of the blocks of the method 500 may, at certain times, be ongoing and/or may repeat. In some implementations, blocks of the method 500 may be combined. The method 500 as shown in FIG. 5 may be implemented in the form of executable instructions stored on a machine-readable storage medium (e.g., the machine-readable storage medium 204) and executed by a processor (e.g., the processing resource 202) and/or in the form of electronic circuitry at the API gateway 102 of FIG. 1. For illustration purposes, the method 400 is described in conjunction with FIG. 1.

At block 502, the API gateway 102 may receive a request to access a backend service from a client application using the new access token. For example, the API gateway 102 may receive a request to access the backend service 110A from the client application 106A. The request may include the new access token. The request from the client application for accessing the backend service using a respective API may also be referred to as an API call. For example, the client application 106A may access the backend service 110A using an API 118A associated with the client application 106A.

At block 504, the API gateway 102 may perform a check to determine whether the new access token is valid. In an example, the API gateway 102 may determine whether the new access token is valid based on a validity timestamp associated with the new access token. In situations where the new access token is received before an expiry time indicated in the validity timestamp, the new access token is determined to be valid. In another example, the API gateway 102 may decrypt the access token and extract information from the access token. The information may include an identifier, a signature, a validity timestamp, a server ID, a client device type, and a geolocation of the client device. The API gateway 102 may compare the information extracted from the new access token with the information corresponding to the new access token stored at the token database 116 of the API gateway 102 to validate the new access token before allowing access to the backend service.

At block 504, in situations where the new access token is invalid, the API gateway 102 may deny (at block 506) the request to access the backend service and transmit an error message. For example, the API gateway 102 may transmit an error message to the client application 106A when the new access token is invalid. At block 504, when the API gateway 102 determines that the new access token is valid, the API gateway 102 may direct (block 508) the client application request to the backend service. The API gateway 102 directs the client application request to the backend service via an API. For example, the API gateway 102 may direct the request from the client application 106A to the backend service 110A via the API 118A.

In the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. A method comprising:
 receiving, by an application programming interface (API) gateway, a refresh token request from a client application for generation of a new access token;
 determining, by the API gateway, a first time associated with receipt of the refresh token request and a second time associated with generation of a current access token;
 determining, by the API gateway, whether a difference between the first time and the second time is within a pre-defined threshold duration, wherein the pre-defined threshold duration is set based on a validity of the current access token or the backend service associated with the current access token; and
 denying, by the API gateway, the refresh token request for generating the new access token in response to determining that the difference between the first time and the second time is within the pre-defined threshold duration.

2. The method of claim 1, wherein denying the refresh token request comprises transmitting, by the API gateway, the current access token back to the client application.

3. The method of claim 1, wherein denying the refresh token request further comprises blocking processing of subsequent refresh token requests to prevent a denial of service (DOS) attack on the API gateway.

4. The method of claim 3, wherein denying the refresh token request further comprises rate-limiting, by the API gateway, processing of subsequent refresh token requests from the client application.

5. The method of claim 1, further comprising:
 approving, by the API gateway, the refresh token request in response to determining that the difference between the first time and the second time is greater than the pre-defined threshold duration;
 generating, by the API gateway, the new access token for the client application based on the approval of the refresh token request; and
 transmitting, by the API gateway, the new access token to the client application.

6. The method of claim 5, further comprising:
 receiving, by the API gateway, a request to access the backend service from the client application, wherein the request comprises the new access token;
 determining, by the API gateway, whether the new access token is valid; and
 in response to determining that the new access token is valid, directing, by the API gateway, the request from the client application to the backend service.

7. The method of claim 1, further comprising maintaining, by the API gateway, information associated with the current access token at the API gateway, wherein the information comprises at least of a timestamp associated with the generation of the current access token, a server ID, or an identifier.

8. A system for processing requests at an application programming interface (API) gateway, the system comprising:

a processing resource; and a machine-readable storage medium coupled to the processing resource, the machine-readable storage medium storing instructions executable by the processing resource to:

receive a refresh token request from a client application for generation of a new access token;

determine a first time associated with receipt of the refresh token request and a second time associated with generation of a current access token;

determine whether a difference between the first time and the second time is within a pre-defined threshold duration, wherein the pre-defined threshold duration is set based on validity of the current access token or the backend service associated with the current access token; and deny the refresh token request in response to determining that the difference between the first time and the second time is within the pre-defined threshold duration.

9. The system of claim 8, wherein the instructions to deny the refresh token request comprise additional instructions that when executed by the processing resource cause the processing resource to transmit the current access token back to the client application.

10. The system of claim 8, wherein the instructions to deny the refresh token request comprise additional instructions that when executed by the processing resource cause the processing resource to block processing of subsequent refresh token requests from the client application to prevent a denial of service (DOS) attack on the API gateway.

11. The system of claim 8, wherein the instructions to deny the refresh token request comprise additional instructions that when executed by the processing resource cause the processing resource to rate-limit processing of subsequent refresh token requests from the client application.

12. The system of claim 8, wherein the machine-readable medium further stores additional instructions that when executed by the processing resource, cause the processing resource to maintain information associated with the current access token and the refresh token related to the current access token at the API gateway, wherein the information associated with the current access token comprises at least of a timestamp associated with the generation of the current access token, a server ID, or an identifier.

13. The system of claim 8, wherein the machine-readable medium further stores additional instructions that when executed by the processing resource, cause the processing resource to:

approve the refresh token request in response to determining that the difference between the first time and the second time is above the pre-defined threshold duration;

generate the new access token for the client application based on the approval of the refresh token request; and transmit the new access token to the client application.

14. The system of claim 13, wherein the machine-readable medium further stores additional instructions that when executed by the processing resource, cause the processing resource to:

receive a request to access the backend service from the client application, wherein the request comprises the new access token;

determine whether the new access token is valid; and in response to determining that the new access token is valid, direct, by the API gateway, the request from the client application to a resource.

15. A non-transitory machine-readable storage medium comprising instructions executable by a processing resource, the instructions comprising:

instructions to receive a refresh token request from a client application for generation of a new access token;

instructions to determine a first time associated with receipt of the refresh token request and a second time associated with generation of a current access token;

instructions to determine whether a difference between the first time and the second time is within a pre-defined threshold duration, wherein the pre-defined threshold duration is set based on validity of the current access token or the backend service associated with the current access token; and instructions to deny the refresh token request in response to determining that the difference between the first time and the second time is within the pre-defined threshold duration.

16. The non-transitory machine-readable storage medium of claim 15, wherein instructions to deny the refresh token request comprise instructions to transmit the current access token back to the client application.

17. The non-transitory machine-readable storage medium of claim 15, wherein instructions to deny the refresh token request comprise instructions to block processing of subsequent refresh token requests to prevent a denial of service (DOS) attack.

18. The non-transitory machine-readable storage medium of claim 15, wherein instructions to deny the refresh token request comprise instruction to rate-limit processing of subsequent refresh token requests from the client application.

19. The non-transitory machine-readable storage medium of claim 15, wherein instructions to deny the refresh token request comprises:

instructions to determine that the current access token is invalid, instructions to generate the new access token for the client application; and instructions to transmit the new access token to the client application.

20. The non-transitory machine-readable storage medium of claim 19, wherein instructions to deny the refresh token request comprise:

instructions to receive a request to access the backend service from the client application, wherein the request comprises the new access token;

instructions to determine whether the new access token is valid; and instructions to direct client application to the backend service in response to determining that the new access token is valid.

* * * * *